United States Patent
Akiyama

(10) Patent No.: US 10,460,467 B2
(45) Date of Patent: Oct. 29, 2019

(54) OBJECT RECOGNITION PROCESSING APPARATUS, OBJECT RECOGNITION PROCESSING METHOD, AND AUTONOMOUS DRIVING SYSTEM

(71) Applicant: Mitsubishi Electric Corporation, Tokyo (JP)

(72) Inventor: Tomohiro Akiyama, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 247 days.

(21) Appl. No.: 15/602,172

(22) Filed: May 23, 2017

(65) Prior Publication Data

US 2017/0358102 A1 Dec. 14, 2017

(30) Foreign Application Priority Data

Jun. 10, 2016 (JP) ................................. 2016-116285

(51) Int. Cl.
*G06T 7/70* (2017.01)
*G06T 7/20* (2017.01)
(Continued)

(52) U.S. Cl.
CPC ............. *G06T 7/70* (2017.01); *G05D 1/0246* (2013.01); *G06K 9/00805* (2013.01); *G06T 7/20* (2013.01)

(58) Field of Classification Search
None
See application file for complete search history.

(56) References Cited

U.S. PATENT DOCUMENTS

| 5,638,116 A * | 6/1997 | Shimoura | G05D 1/0246 |
| | | | 348/118 |
| 2014/0266651 A1* | 9/2014 | Ansari | B60Q 9/008 |
| | | | 340/425.5 |

(Continued)

FOREIGN PATENT DOCUMENTS

| JP | 5470762 B2 * | 4/2014 |
| JP | 5724955 B2 * | 5/2015 |

(Continued)

OTHER PUBLICATIONS

JP2017-132285 A [machine translation] (Year: 2017).*
JP 5470762 B2 [machine translation] (Year: 2014).*
JP 5724955 B2 [machine translation] (Year: 2015).*

*Primary Examiner* — Michelle M Entezari
(74) *Attorney, Agent, or Firm* — Sughrue Mion, PLLC; Richard C. Turner

(57) ABSTRACT

An object recognition processing apparatus includes: an object fusion processing unit 6 for fusing detection information signals of objects existing around a vehicle, which are detected by a plurality of object detection units to output object fusion signals; a same object fusion result combination candidate selection processing unit for selecting, for a combination of object fusion signals, candidates of the object fusion signals to be combined; a same object fusion result combination determination processing unit for determining whether or not a combination of the selected object fusion signals is a combination of object fusion signals of the same object; and a same object fusion combination integration processing unit for recognizing the objects existing around the vehicle on the basis of a result of the determination.

21 Claims, 4 Drawing Sheets

(51) Int. Cl.
    *G05D 1/02*     (2006.01)
    *G06K 9/00*     (2006.01)

(56) References Cited

U.S. PATENT DOCUMENTS

| | | | |
|---|---|---|---|
| 2015/0112570 A1* | 4/2015 | Schmudderich | B60W 50/14 |
| | | | 701/93 |
| 2016/0116593 A1* | 4/2016 | Kim | G01S 17/06 |
| | | | 701/70 |
| 2017/0043771 A1* | 2/2017 | Ibanez-Guzman | B60W 30/0956 |

FOREIGN PATENT DOCUMENTS

| | | | |
|---|---|---|---|
| JP | 5896823 B2 | 3/2016 | |
| JP | 2017132285 A | * | 8/2017 |

\* cited by examiner

OBJECT RECOGNITION PROCESSING APPARATUS, OBJECT RECOGNITION PROCESSING METHOD, AND AUTONOMOUS DRIVING SYSTEM

BACKGROUND OF THE INVENTION

1. Field of the Invention

The present invention relates to an object recognition processing apparatus, an object recognition processing method, and an autonomous driving system.

2. Description of the Background Art

Conventionally, in autonomous driving technology and precautionary safety driving technology for automobiles, object recognition processing apparatuses are provided with on-vehicle distance measuring devices. The on-vehicle distance measuring device measures, for example, the distance between a vehicle in which the distance measuring device is mounted (hereinafter referred to as "own vehicle") and a peripheral object existing around the own vehicle. Values obtained through the measurement are utilized in: a forward collision mitigation braking system for mitigating damage when the own vehicle collides with an object ahead; an adaptive cruise control system for causing the own vehicle to follow a vehicle ahead within a safe distance; an autonomous parking system for causing the own vehicle to be autonomously parked in a parking space; and the like. That is, the on-vehicle distance measuring device is a device for enhancing safety and comfortability in driving of the own vehicle, and is utilized in applications for vehicles.

The on-vehicle distance measuring device is equipped with a plurality of sensors, and sensor fusion technology for fusing a plurality of sensors is known as technology for enhancing performance of sensing a peripheral object existing around the own vehicle. For example, in Japanese Patent Publication No. 5896823, the distance between an own vehicle and a peripheral object existing around the own vehicle as well as the position of the peripheral object are measured by using values measured by a plurality of sensors having different observation accuracies.

In the sensor fusion technology disclosed in Japanese Patent Publication No. 5896823, when the own vehicle is tracking a vehicle ahead, a sensor, among the plurality of sensors, having higher accuracy senses the vehicle ahead of the own vehicle (that is, the sensor having higher accuracy does not detect a peripheral object existing around the own vehicle) while a sensor, among the plurality of sensors, having lower accuracy detects a peripheral object existing around the own vehicle and measures the distance between the own vehicle and the peripheral object. The on-vehicle distance measuring device generates a record (hereinafter referred to as "track") of transition of the position of the peripheral object for each predetermined time period by using the measured distance.

In the sensor fusion technology disclosed in Japanese Patent Publication No. 5896823, for example, if the sensor having higher accuracy detects a peripheral object existing around the own vehicle and the sensor having lower accuracy also detects a peripheral object existing around the own vehicle, the plurality of sensors will detect the same object (the peripheral object). That is, the sensors having different accuracies will detect the same object. As a result, the distance measured by the sensor having higher accuracy and the distance measured by the sensor having lower accuracy may have different values. Accordingly, two tracks are generated, that is, a track is generated based on the distance measured by the sensor having higher accuracy, and another track is generated based on the distance measured by the sensor having lower accuracy. Thus, the sensor fusion technology disclosed in Japanese Patent Publication No. 5896823 has a problem that a plurality of tracks are generated for one object.

SUMMARY OF THE INVENTION

The present invention has been made to solve the above-described problem, and it is an object of the present invention to provide an object recognition processing apparatus capable of accurately recognizing the distance between an own vehicle and a peripheral object, and the position of the peripheral object, compared with the conventional object recognition processing apparatus.

An object recognition processing apparatus according to the present invention detects objects existing around a vehicle by using a plurality of object detection units, and receives detection information of the objects from the respective object detection units. The object recognition processing apparatus includes a processor for executing a program, and a storage device in which the program is stored. The processor executes the program to perform the operations of: fusing detection information signals of the objects detected by the plurality of object detection units to output object fusion signals; selecting, for a combination of object fusion signals, candidates of the object fusion signals to be combined; determining whether or not a combination of the selected object fusion signals is a combination of object fusion signals of the same object; and recognizing the objects existing around the vehicle on the basis of a result of the determination.

According to the present invention, it is possible to accurately recognize the distance between an own vehicle and a peripheral object and the position of the peripheral object, compared with the conventional object recognition processing apparatus.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

In the first embodiment of the present invention, an object recognition processing apparatus and an object recognition processing method will be described, which include: determining whether or not a combination of fusion signals of outputs from a plurality of sensors is a combination of fusion signals of the same object, and integrating combinations of fusion signals determined to be fusion signals of the same object.

Examples of the outputs from the plurality of sensors include: a relative position of a peripheral object to an own vehicle; a relative speed of the peripheral object to the own vehicle; identification information (vehicle, person, etc.) of the peripheral object; sensor detection accuracy; and sensor identification reliability. When the relative positions of the peripheral object to the own vehicle, which are outputted from the plurality of sensors, are combined, the respective relative positions are weighted according to the detection accuracies of the sensors, and the weighted values are summed to obtain a value that is a relative position considered as a recognition result. When pieces of identification information of the peripheral object, which are outputted from the plurality of sensors, are combined, identification information outputted from a sensor having higher sensor identification reliability is an identification result considered as a recognition result. Thus, "fusion" means combining the outputs from the plurality of sensors in the above-described manner.

Figure 1:
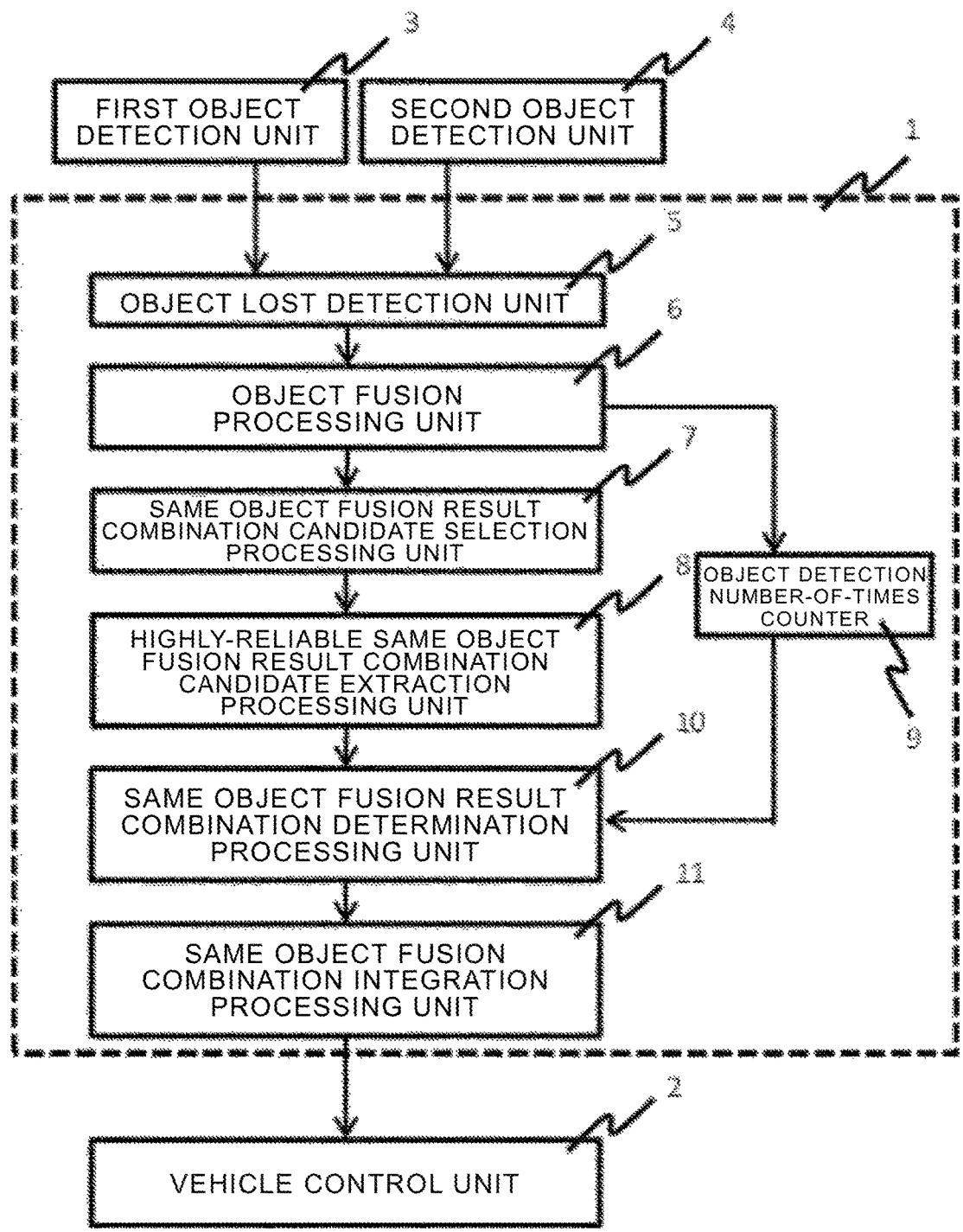
FIG. 1 is a block diagram showing an object recognition processing apparatus according to a first embodiment of the present invention.

Hereinafter, the object recognition processing apparatus according to the first embodiment of the present invention will be described on the basis of FIG. 1, FIG. 2A, and FIG. 2B. FIG. 1 is a block diagram showing the object recognition processing apparatus 1 according to the first embodiment of the present invention, together with a vehicle control unit 2. It is noted that arrows in FIG. 1 indicate the flow of signals.

A vehicle to which the object recognition processing apparatus 1 according to the present invention is mounted is provided with, as the plurality of sensors, a first object detection unit 3 and a second object detection unit 4. Each of the first object detection unit 3 and the second object detection unit 4 is composed of, for example, a millimeter wave radar, a laser radar, a camera, an ultrasonic sensor, a vehicle-to-vehicle communication apparatus (an apparatus for communication among a plurality of automobiles), or the like. Each of the first object detection unit 3 and the second object detection unit 4 is configured to measure the distance between the own vehicle and a peripheral object existing around the own object, and the relative position of the peripheral object to the own object. The measured distance and relative position are outputted as a distance signal and a relative-position signal to an object lost detection unit 5. It is noted that object detection information includes the distance signal and the relative-position signal. Further, the object detection information as an output from each of the first object detection unit 3 and the second object detection unit 4 also includes object identification information and speed information in addition to the distance signal and the relative-position signal.

The first object detection unit 3 and the second object detection unit 4 mounted to the own vehicle may be implemented by devices of the same type, for example, both the units 3 and 4 may be millimeter wave radars. Alternatively, the first object detection unit 3 and the second object detection unit 4 may be implemented by devices of different types, for example, the first object detection unit 3 may be a millimeter wave radar while the second object detection unit 4 is a camera. Further, the first object detection unit 3 and the second object detection unit 4 may have the same sensing accuracy or may have different sensing accuracies.

The object lost detection unit 5 is a processing unit configured to detect erroneous detection (hereinafter referred to as "lost") of a peripheral object by each of the first object detection unit 3 and the second object detection unit 4, and counts the number of times of "lost".

An object fusion processing unit 6 receives the object detection information outputted from each of the first object detection unit 3 and the second object detection unit 4, and receives the number of times of "lost" in object detection, which has been detected by the object lost detection unit 5. Further, the object fusion processing unit 6 performs fusion of the object detection information from the first object detection unit 3 with the object detection information from the second object detection unit 4.

A same object fusion result combination candidate selection processing unit 7 is a processing unit configured to select combination candidates of fusion results of the same object from the object fusion results obtained in the object fusion processing unit 6. That is, the same object fusion result combination candidate selection processing unit 7 selects combination candidates of fusion results. This process corresponds to steps S101 to S111 in FIG. 2A described later.

A highly-reliable same object fusion result combination candidate extraction processing unit 8 is a processing unit configured to extract, from the combination candidates of fusion results of the same object, a combination of fusion results having higher detection reliability of the object detection information. This process corresponds to steps S121 to S122 and step S104 in FIG. 2A and FIG. 2B described later.

An object detection number-of-times counter 9 is a processing unit configured to calculate the sum of the numbers of times of object detection, which are fused in the object fusion processing unit 6.

A same object fusion result combination determination processing unit 10 is a processing unit configured to determine whether or not signals from the highly-reliable same object fusion result combination candidate extraction processing unit 8 are fusion signals of the same object. This process corresponds to steps S131 to S134 and step S104 in FIG. 2B described later.

A same object fusion combination integration processing unit 11 is a processing unit configured to integrate a combination determined to be a combination of fusion signals of the same object. This process corresponds to step S141 and step S104 in FIG. 2B described later.

Finally, the vehicle control unit 2 is configured to control motions of the own vehicle, such as a yaw rate, a steering angle, a vehicle speed, etc. of the own vehicle, on the basis of the recognition result of the object recognition processing apparatus 1.

As described above, in the object recognition processing apparatus shown in FIG. 1, the object lost detection unit 5 detects "lost" of objects of the first object detection unit 3 and the second object detection unit 4, and outputs an object lost signal. Upon receiving the object lost signal, the object fusion processing unit 6 fuses detection information signals of the objects detected by the plurality of object detection units, and outputs object fusion signals. The same object fusion result combination candidate selection processing unit 7 selects, for a combination of object fusion signals, candidates of the object fusion signals to be combined. The highly-reliable same object fusion result combination candidate extraction processing unit 8 selects, from the candidates, a combination of fusion results having higher detection reliability of the object detection information. The object detection number-of-times counter 9 calculates the sum of the numbers of times of object detection, which are fused by the object fusion processing unit 6. The same object fusion result combination determination processing unit 10 determines whether or not the selected combination of the object fusion signals is a combination of fusion signals of the same object. The same object fusion combination integration processing unit 11 recognizes an object existing around the vehicle, on the basis of the result of the determination.

Hereinafter, the operations of the respective components shown in FIG. 1 will be described in more detail.

The same object fusion result combination candidate selection processing unit 7 selects, for a combination of object fusion signals, candidates of the object fusion signals to be combined, on the basis of object motion specification difference conditions.

Regarding the result of fusion of a plurality of objects which is obtained through the process performed by the object fusion processing unit 6, the object motion specification difference conditions include at least one of (1) difference in position between the objects, (2) difference in speed between the objects, and (3) difference in acceleration between the objects. When the object fusion processing unit 6 adds an object feature information signal to the object fusion signal and outputs the object fusion signal, the same object fusion result combination candidate selection processing unit 7 is allowed to change the object motion specification difference conditions on the basis of the object identification information.

When the object fusion processing unit 6 adds the object feature information signal (described later) to the object fusion signal and outputs the object fusion signal, the same object fusion result combination candidate selection processing unit 7 selects, for a combination of object fusion signals, candidates of the object fusion signals to be combined, on the basis of the object feature information signal received from the object fusion processing unit 6. The object feature information signal includes at least one of direction, identification information, color, and reception level, of the corresponding object.

On the basis of a detection reliability condition signal (described later) received from each of the first object detection unit 3 and the second object detection unit 4, the highly-reliable same object fusion result combination candidate extraction processing unit 8 performs narrowing of the combination candidates of fusion results of the same object, for a combination of object fusion signals which satisfies detection reliability conditions included in the detection reliability condition signal.

The detection reliability conditions include at least one of (1) the number of times the object fusion processing unit 6 cannot fuse the object detection information signals (in other words, the number of times of "lost" of object fusion signals), (2) the detection position of the object, (3) the detection reliability of the object, and (4) estimation error of detection of the object.

In a combination of object fusion signals selected in the latest n processing periods (n: natural number), if the number of times of object detections used for fusion of objects for the latest n processing periods is equal to or more than a same object fusion result combination determination threshold, the same object fusion result combination determination processing unit 10 determines that the combination is a combination of fusion results of the same object. If a plurality of detection information signals of the objects used for fusion of objects for the latest n processing periods are all detected by the same object detection unit (i.e., only by one of the first object detection unit 3 and the second object detection unit 4), the same object fusion result combination determination processing unit 10 does not determine whether or not the combination is a combination of fusion results of the same object. Further, if the object detection unit, which has generated combination candidates of object fusion signals (i.e., one of the first object detection unit 3 and the second object detection unit 4), detects the combination candidates of fusion results of the same object at the same timing, the same object fusion result combination determination processing unit 10 does not determine whether or not the combination is a combination of fusion results of the same object.

The same object fusion combination integration processing unit 11 recognizes the object existing around the vehicle on the basis of at least one of the following values: an average value of a plurality of object fusion signals; a median value thereof; a mode value thereof; a shortest vertical position thereof; and a value obtained by weighting the plurality of object fusion signals, considering estimated errors thereof, and integrating the weighted object fusion signals.

The same object fusion combination integration processing unit 11 may determine at least one of: an average value of relative positions, relative speeds, or relative accelerations included in a plurality of object fusion signals; a median value thereof; a mode value thereof; a shortest vertical position thereof; and a value obtained by weighting the plurality of object fusion signals while considering estimated errors thereof, and integrating the weighted object fusion signals, and may recognize the object existing around the own vehicle on the basis of the determined value. For example, when calculating the recognition result by using the average value, it is assumed that the plurality of object fusion signals are a track 1 and a track 2, and the relative position of the track 1 is x1 and the relative position of the track 2 is x2. Then, the relative position of the object recognition signal is expressed by (x1+x2)/2.

The method of weighting and integrating the object fusion results while considering the estimation errors thereof is expressed by the following expression when the horizontal position of the object recognition result is taken as an example. It is noted that a $(0 \leq a \leq 1)$ depends on the estimation errors of the track 1 and the track 2.

When the estimation error of the horizontal position of the track 1 is larger than the estimation error of the horizontal position of the track 2, a is a value smaller than 0.5. When the estimation error of the horizontal position of the track 1 is smaller than the estimation error of the horizontal position of the track 2, a is a value larger than 0.5.

horizontal position of object recognition result=$a \times$ horizontal position of track 1+$(1-a) \times$horizontal position of track 2

It is noted that, regarding the vertical position, the horizontal speed, and the vertical speed, the method of weighting and integrating the object fusion signals while considering the estimation errors thereof is similar to that described above.

As described above, the same object fusion combination integration processing unit 11 recognizes the object existing around the own vehicle by using the object fusion signals corresponding to the latest n processing periods.

Next, the operation processing of the object recognition processing apparatus 1 according to the first embodiment will be described in detail with reference to FIG. 2A and FIG. 2B. FIG. 2A and FIG. 2B are flowcharts illustrating the operation processing of the object recognition processing apparatus 1.

Figure 2A:
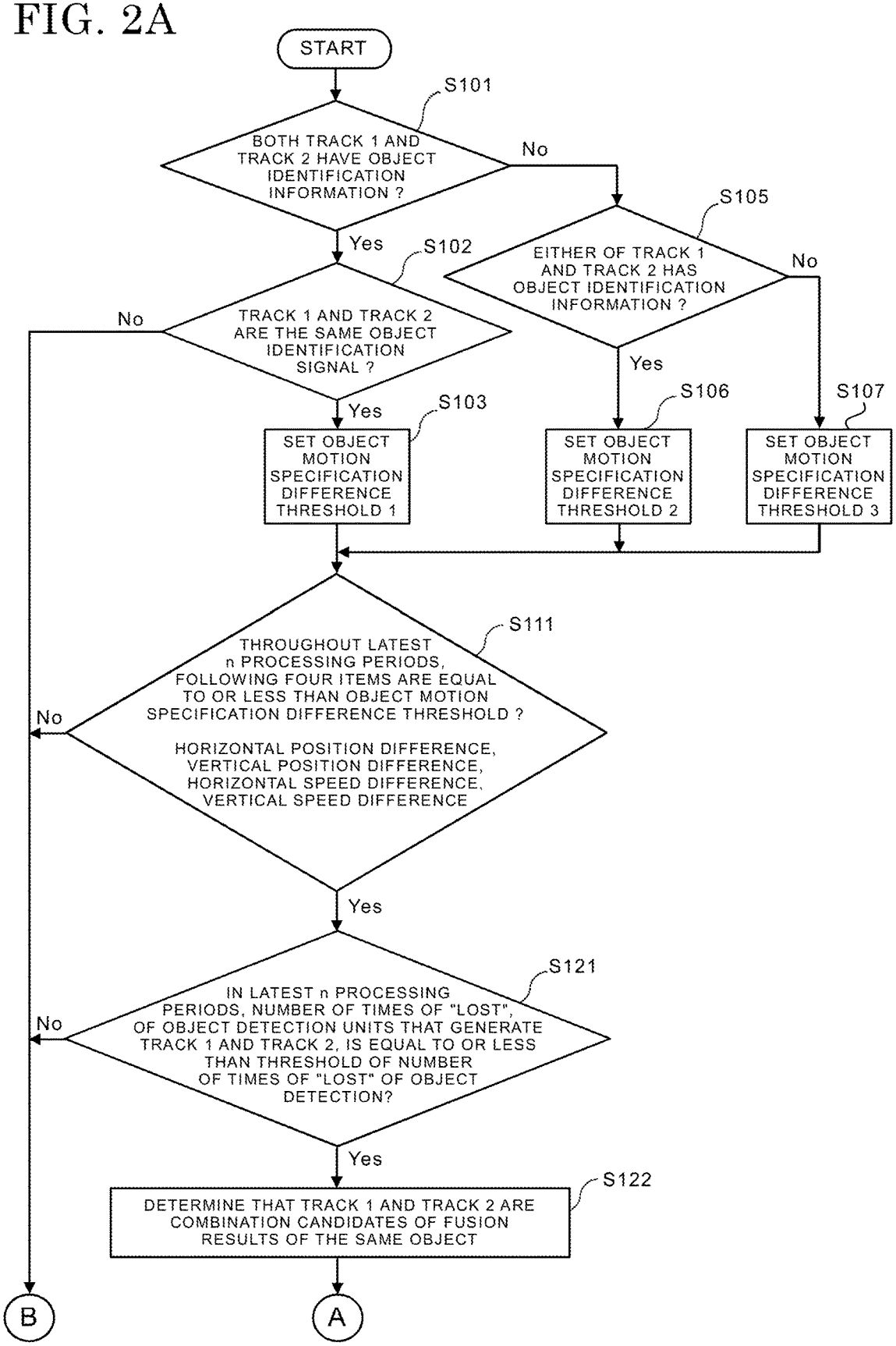
FIG. 2A is a flowchart (first part) showing object recognition processing according to the first embodiment of the present invention.
Figure 2B:
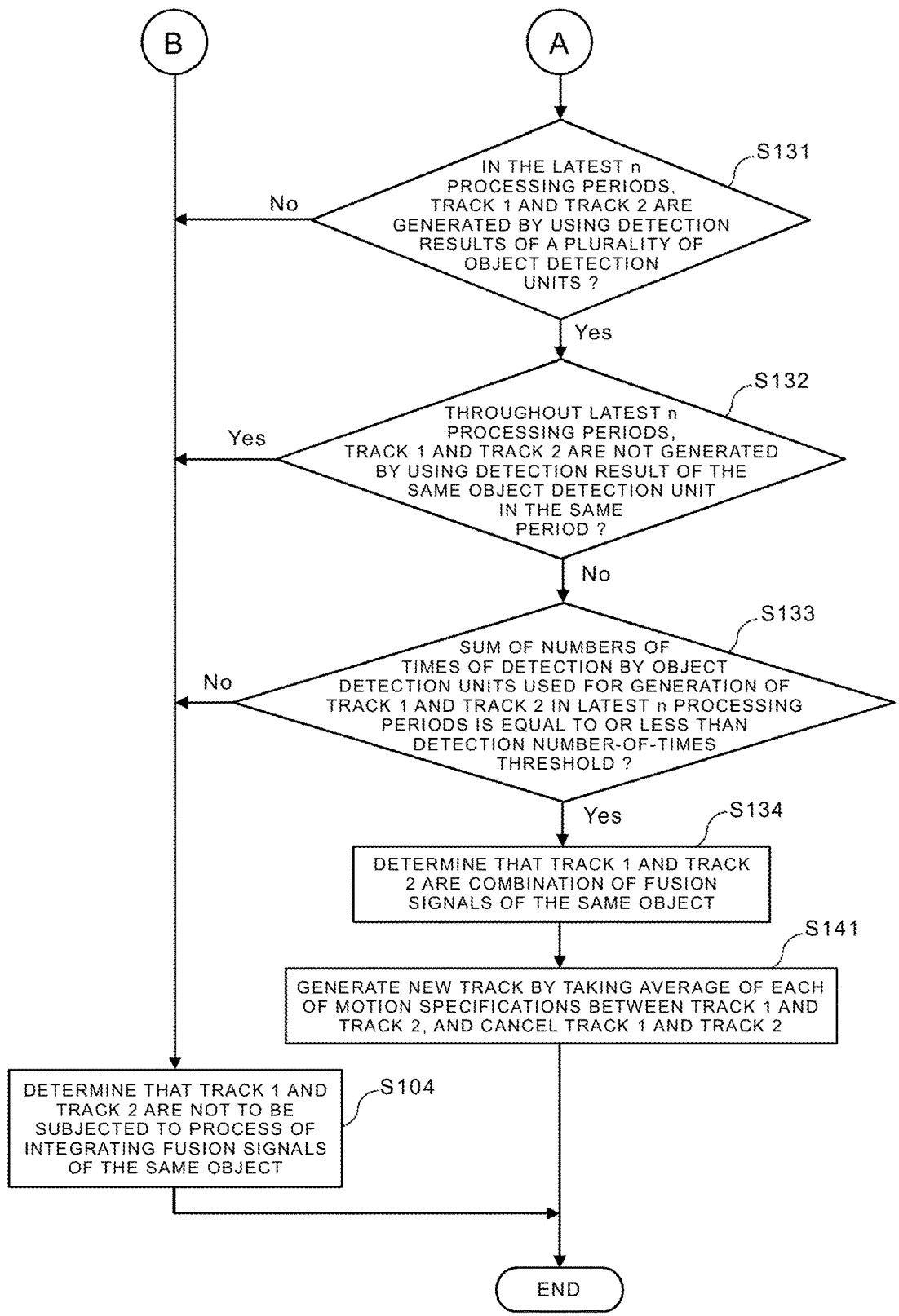
FIG. 2B is a flowchart (second part) showing the object recognition processing according to the first embodiment of the present invention.

As shown in FIG. 1, FIG. 2A, and FIG. 2B, the inputs to the same object fusion result combination candidate selection processing unit 7 are two fusion signals selected from all object fusion signals, and are referred to as a track 1 and a track 2, respectively. The term "track" means a record of transition of the position of the corresponding peripheral object for each predetermined time period.

First, in step S101, it is determined whether or not both the track 1 and the track 2 have object identification information. When the result of determination in step S101 is that both the track 1 and the track 2 have object identification information (Yes in step S101), the processing proceeds to step S102. In step S102, it is determined whether or not the track 1 and the track 2 have the same object identification signals.

When the result of determination in step S102 is that the track 1 and the track 2 have the same object identification signal (Yes in step S102), an object motion specification difference threshold 1 is set as an object motion specification threshold in step S103.

When the result of determination in step S102 is that the track 1 and the track 2 do not have the same object identification signal (No in step S102), the processing proceeds to step S104. In step S104, it is determined that the combination of the track 1 and the track 2 is not to be subjected to the process of integrating the fusion signals of the same object, and the processing is ended.

The reason is as follows. When the result of the determination in step S102 is that the object identification signals of the track 1 and the track 2 are different from each other, it is determined that the track 1 and the track 2 are highly likely to be the fusion results of different objects and therefore are not to be subjected to the process of integrating the fusion signals of the same object, thereby reducing the risk of erroneous integration of the fusion signals of different objects.

When the result of the determination in step S101 is that not both the track 1 and the track 2 have object identification information (No in step S101), the processing proceeds to step S105. In step S105, it is determined whether or not either of the track 1 or the track 2 has object identification information.

When the result of determination in step S105 is that either of the track 1 or the track 2 has object identification information (Yes in step S105), the processing proceeds to step S106. In step S106, an object motion specification difference threshold 2 is set as an object motion specification threshold.

When the result of determination in step S105 is that neither the track 1 nor the track 2 have object identification information (No in step S105), the process proceeds to step S107. In step S107, an object motion specification difference threshold 3 is set as an object motion specification threshold.

Regarding the setting of the object motion specification thresholds, for example, the object motion specification threshold that is set when the track 1 and the track 2 have the same object identification information (Yes in step S102) is set to be higher than the object motion specification threshold that is set when either of the track 1 or the track 2 has object identification information (Yes in step S105) or when neither the track 1 nor the track 2 have object identification information (No in step S105).

If the object identification signals are the same, the possibility of being the same object is high, and the threshold is raised to relax the same object determination criterion. On the other hand, the object motion specification difference threshold is lowered when there is a possibility of being different object identification information, whereby the risk of erroneous integration of the fusion signals of different objects can be reduced.

While in step S101, step S102, and step S105, determination is made based on the object identification information as described above, object direction, color, or reception level may be used. Also in this case, as in the determination based on the object identification information, when object directions, colors, or reception levels of the track 1 and the track 2 are significantly different from each other, it is determined that the combination of the track 1 and the track 2 is not to be subjected to the process of integrating the fusion results of the same object.

Subsequently, in step S111, regarding the track 1 and the track 2 in the latest n processing periods, if all the horizontal position difference, the vertical position difference, the horizontal speed difference, and the vertical speed difference between the track 1 and the track 2 in each period are equal to or less than the object motion specification difference threshold determined in step S103, step S106, or step S107 (Yes in step S111), the processing proceeds to step S121.

On the other hand, in step S111, regarding the track 1 and the track 2 in the latest n processing periods, if even one of the horizontal position difference, the vertical position difference, the horizontal speed difference, and the vertical speed difference between the track 1 and the track 2 in each period is more than the object motion specification difference threshold determined in step S103, step S106, or step S107 (No in step S111), the processing proceeds to step S104. In step S104, it is determined that the combination of the track 1 and the track 2 is not to be subjected to the process of integrating the fusion signals of the same object, and the processing is ended.

In step S111, for example, a motion specification difference evaluation value may be set by weighting the values of the respective motion specifications as shown by the following expression. Then, the combination of the track 1 and the track 2 may be determined to be subjected to the process of integrating the fusion signals of the same object when the motion specification difference evaluation value is less than a fixed threshold, and may be determined not to be subjected to the process of integrating the fusion signals of the same object when the motion specification difference evaluation value is equal to or more than a fixed threshold.

$$\text{motion specification difference evaluation value} = c \times \text{horizontal position difference} + d \times \text{vertical position difference} + e \times \text{horizontal speed difference} + f \times \text{vertical speed difference}$$

where, c, d, e, and f are given values.

As described above, in combination extraction, if the object motion specification difference between the track 1 and the track 2 is equal to or less than the object motion specification difference threshold, the track 1 and the track 2 are determined as combination candidates of fusion signals of the same object, whereby it is possible to reduce the risk of erroneous integration of fusion signals of different objects.

Next, in step S121, regarding the track 1 and the track 2 in the latest n processing periods, if the number of times both the track 1 and the track 2 could not be correlated with the detection information of the object detection units in the same period (i.e., the number of times of "lost" in object detection, which is detected by the object lost detection unit 5) is equal to or less than a predetermined threshold (e.g., n/3 times) (Yes in step S121), the processing proceeds to step S122. In step S122, it is determined that the track 1 and the track 2 are combination candidates of fusion signals of the same object, and the processing proceeds to step S131.

On the other hand, in step S121, regarding the track 1 and the track 2 in the latest n processing periods, if the number of times of "lost" in object detection, which is calculated by the object lost detection unit 5 that has generated the track 1 and the track 2, is more than n/3 times (No in step S121), the processing proceeds to step S104. In step S104, it is determined that the combination of the track 1 and the track 2 is not to be subjected to the process of integrating the fusion signals of the same object, and the processing is ended.

That is, during the latest n processing periods, if the number of times of "lost" in object detection, which is calculated by the object lost detection unit 5 that have generated the track 1 and the track 2, is more than n/3, it is determined that detection reliability of one or both of the track 1 and the track 2 is low, and the combination of the track 1 and the track 2 is determined not to be subjected to the process of integrating the fusion signals of the same object, whereby the risk of erroneous integration of fusion signals of different objects can be reduced.

On the basis of the detection positions and the estimation errors of the track 1 and the track 2, a combination of the track 1 and the track 2, having low detection reliability, may be determined not to be subjected to the process of integrating the fusion signals of the same object. If the track 1 and the track 2 have detection reliability information, the detection reliability information may be utilized as it is so that the combination having low detection reliability is determined not to be subjected to the process of integrating the fusion signals of the same object.

The process corresponding to step S121 and step S122 described above is a process for extracting a combination having higher reliability, such as a combination having high detection reliability of the object detection unit, from among combinations already selected in the process corresponding to step S101 through step S111 (i.e., selected by the same object fusion result combination candidate selection processing unit 7). Therefore, there is no problem even if the process corresponding to step S121 and step S122 is omitted.

Subsequently, in step S131, if the track 1 and the track 2 are generated by using detection information detected by a plurality of object detection units during the latest n processing periods (Yes in step S131), the processing proceeds to step S132.

On the other hand, in step S131, if the track 1 and the track 2 are generated by using detection information of the same object detection unit during the latest n processing periods (No in step S131), the processing proceeds to step S104. In step S104, it is determined that the combination of the track 1 and the track 2 is not to be subjected to the process of integrating the fusion signals of the same object, and the processing is ended.

That is, if the track 1 and the track 2 are generated by using only the detection information of the same object detection unit during the latest n processing periods, it is determined that the track 1 and the track 2 are highly likely to be the fusion results of different objects, and the tracks 1 and track 2 are determined not to be subjected to the process of integrating the fusion signals of the same object. Thus, the risk of erroneous integration of the fusion signals of different objects can be reduced.

Subsequently, in step S132, if the track 1 and the track 2 are not generated by using detection information of the same object detection unit in the same period, throughout the latest n processing periods (No in step S132), the processing proceeds to step S133.

On the other hand, in step S132, if the track 1 and the track 2 are generated by using the detection information of the same object detection unit in the same period, throughout the latest n processing periods (Yes in step S132), the processing proceeds to step S104. In step S104, it is determined that the combination of the track 1 and the track 2 is not to be subjected to the process of integrating the fusion signals of the same object, and the processing is ended.

Subsequently, in step S133, if the sum of the numbers of times of object detection, which has been calculated by the object detection number-of-times counter 9 and used for generation of the track 1 and the track 2 in the latest n processing periods, is equal to or less than a predetermined detection number-of-times threshold, e.g., $3 \times (2 \times n)/5$ (Yes in step S133), the processing proceeds to step S134. In step S134, the same object fusion result combination determination processing unit 10 determines that the combination of the track 1 and the track 2 is a combination of fusion signals of the same object.

On the other hand, in step S133, if the sum of the numbers of times of object detection, which has been calculated by the object detection number-of-times counter 9 and used for generation of the track 1 and the track 2 in the latest n processing periods, is more than the predetermined detection number-of-times threshold, e.g., $3 \times (2 \times n)/5$ (No in step S133), the processing proceeds to step S104. In step S104, it is determined that the combination of the track 1 and the track 2 is not to be subjected to the process of integrating the fusion signals of the same object, and the processing is ended.

That is, it is estimated that the sum of the numbers of times of object detection, which has been used for generation of the track 1 and the track 2 in the latest n processing periods, is small when the track 1 and the track 2 are fusion signals of the same object, compared to the case where the track 1 and the track 2 are fusion signals of different objects. Therefore, if the sum of the numbers of times of object detection, which has been used for generation of the track 1 and the track 2 in the latest n processing periods, is more than the predetermined detection number-of-times threshold, e.g., $3 \times (2 \times n)/5$, the track 1 and the track 2 are not to be subjected to the process of integrating the fusion signals of the same object. Thus, it is possible to reduce the risk of erroneous integration of fusion signals of different objects.

Subsequently, in step S141, a new track is generated based on an average value of each of the motion specifications between the track 1 and the track 2, and the current track 1 and track 2 are canceled to end the processing. The series of processes described above is performed on all combinations of object fusion signals.

In this embodiment, a new track is generated based on an average value of each of the motion specifications between the track 1 and the track 2. However, a new track may be generated based on a median value, a mode value, or a shortest vertical position of each of the motion specifications between the track 1 and the track 2. Alternatively, a new track may be generated by weighting the respective motion specifications while considering the estimation errors of the track 1 and the track 2.

A method of integrating a plurality of tracks may be determined on the basis of the object identification information of the object fusion signals.

Alternatively, by using data of the track 1 and the track 2 for m processing periods (m: natural number) in the past, a new track may be generated based on an average value, a median value, a mode value, or a shortest vertical position of the data, or a new track may be generated by weighting the data while considering the estimation errors of the track 1 and the track 2.

Although in the present embodiment two object fusion signals are selected from all the object fusion signals, three or more object fusion signals may be selected to implement the present embodiment.

The vehicle control unit 2 performs, for example, control of a forward collision mitigation braking system for mitigating damage when the own vehicle collides with an object ahead, and an adaptive cruise control system for causing the own vehicle to follow a vehicle ahead within a safe distance, by using information such as the distance between the own vehicle and a peripheral object existing around the own vehicle, the position of the peripheral object, or the like, which is obtained by the object recognition processing apparatus 1. That is, autonomous driving of the own vehicle is realized on the basis of the object recognition result of the object recognition processing apparatus 1.

Figure 3:
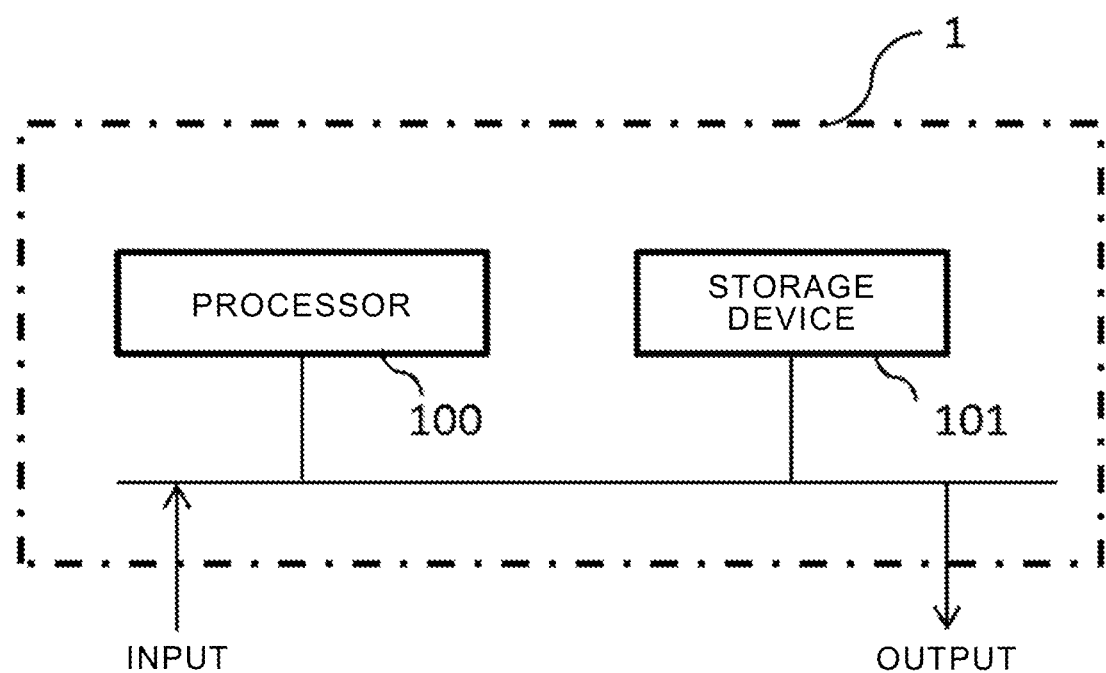
FIG. 3 is a hardware configuration diagram showing the object recognition processing apparatus according to the first embodiment of the present invention.

FIG. 3 shows an example of hardware of the object recognition processing apparatus 1. The object recognition processing apparatus 1 is composed of a processor 100 and a storage unit 101 as shown in FIG. 3. The storage unit 101 includes, although not shown, a volatile storage device such as a random access memory, and a nonvolatile auxiliary storage device such as a flash memory. The storage unit 101 may include, instead of a flash memory, an auxiliary storage device such as a hard disk. The processor 100 executes a program loaded from the storage unit 101. In this case, the program is loaded from the auxiliary storage device to the processor 100 via the volatile storage device. The processor 100 may output data of the calculation result and the like to the volatile storage device of the storage unit 101, or may store the data in the auxiliary storage device via the volatile storage device.

It is noted that, within the scope of the present invention, the above embodiment may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. An object recognition processing apparatus comprising:
   a processor for executing a program; and
   a storage device in which the program is stored, wherein the processor executes the program to:
   receive a first detection information signal from a first object detection unit and a second detection information signal from a second object detection unit that is different from the first object detection unit;
   determine whether or not both the first detection information signal and the second detection information signal have object identification information;
   determine whether first object identification information in the first detection information signal is different from second object identification information in the second detection information signal if both the first detection information signal and the second detection information signal have object identification information;
   based on the first object identification information being determined to not be different from the second object identification information, set an object motion difference threshold to a first value;
   based on one of the first detection information signal and the second detection information signal having object identification information, or none of the first detection information signal and the second detection information signal having object identification information, set the object motion difference threshold to a second value that is less than the first value;
   determine whether a difference between first position or speed information of the first detection information signal and second position or speed information of the second detection information signal is equal to or less than the object motion difference threshold; and
   based on the difference between the first position or speed information and the second position or speed information being determined to be equal to or less than the object motion difference threshold:
   fuse the first and second detection information signals into one fused signal for a same object; and
   recognize the same object existing around the vehicle on the basis of the fused signal for the same object.

2. The object recognition processing apparatus according to claim 1, wherein
   a combination of object fusion signals, having higher detection reliability of object detection information, is extracted from selected candidates of the object fusion signals, and
   it is determined whether or not the combination of the extracted object fusion signals is a combination of object fusion signals of the same object.

3. The object recognition processing apparatus according to claim 1, wherein for a combination of object fusion signals, candidates of the object fusion signals to be combined are selected on the basis of detection reliability condition signals received from the object detection units.

4. The object recognition processing apparatus according to claim 3, wherein object fusion signals satisfying detection reliability conditions included in the detection reliability condition signals received from the object detection units are selected as the candidates.

5. The object recognition processing apparatus according to claim 3, wherein the detection reliability conditions include at least one of: a number of times by which detection information signals of objects cannot be fused, detection positions of the objects, detection reliabilities of the objects, or estimation errors of detection of the objects.

6. The object recognition processing apparatus according to claim 4, wherein the detection reliability conditions include at least one of: a number of times by which detection information signals of objects cannot be fused, detection positions of the objects, detection reliabilities of the objects, or estimation errors of detection of the objects.

7. The object recognition processing apparatus according to claim 1, wherein for a combination of object fusion signals, candidates of the object fusion signals to be combined are selected on the basis of object motion specification difference conditions.

8. The object recognition processing apparatus according to claim 7, wherein the object motion specification difference conditions include, regarding a result of fusion of a plurality of objects, at least one of: a difference in position between the objects, a difference in speed between the objects, or a difference in acceleration between the objects.

9. The object recognition processing apparatus according to claim 7, wherein when an object feature information signal is added to each of the object fusion signals and the object fusion signals are outputted, the object motion specification difference conditions are changed on the basis of object identification information.

10. The object recognition processing apparatus according to claim 7, wherein when an object feature information signal is added to each of the object fusion signals and the object fusion signals are outputted, for a combination of object fusion signals, candidates of the object fusion signals to be combined are selected on the basis of the object feature information signals.

11. The object recognition processing apparatus according to claim 9, wherein the object feature information signal includes at least one of a direction, identification information, a color, or a reception level, of the corresponding object.

12. An object recognition processing apparatus for detecting objects existing around a vehicle by using a plurality of object detection units, and receiving detection information of the objects from the respective object detection units, the apparatus comprising:
a processor for executing a program; and
a storage device in which the program is stored, the processor executing the program to perform the operations of:
fusing detection information signals of the objects detected by the plurality of object detection units to output object fusion signals;
selecting, for a combination of object fusion signals, candidates of the object fusion signals to be combined;
determining whether or not a combination of the selected object fusion signals is a combination of object fusion signals of the same object; and
recognizing the objects existing around the vehicle on the basis of a result of the determination, wherein when determining whether or not the combination of the selected object fusion signals is a combination of object fusion signals of the same object, if, in a combination of the object fusion signals selected in latest n processing periods (n: natural number), the number of times of object detections used for fusion of objects for the latest n processing periods is equal to or more than a determination threshold for combination of fusion signals of the same object, this combination is determined to be a combination of fusion results of the same object.

13. The object recognition processing apparatus according to claim 1, wherein when determining whether or not a combination of selected object fusion signals is a combination of object fusion signals of the same object, if, with respect to a combination of the object fusion signals selected in latest n processing periods (n: natural number), a plurality of detection information signals of objects used for fusion of objects for the latest n processing periods are all detected by the same object detection unit, the determination as to whether or not this combination is a combination of object fusion signals of the same object is not performed.

14. The object recognition processing apparatus according to claim 1, wherein when determining whether or not a combination of selected object fusion signals is a combination of object fusion signals of the same object, if the object detection units, which have generated combination candidates of the selected object fusion signals, detect combination candidates of fusion results of the same object at a same timing, the determination as to whether or not the combination candidates are object fusion signals of the same object is not performed.

15. The object recognition processing apparatus according to claim 1, wherein when recognizing an object existing around a vehicle, recognition is performed on a basis of an average value of a plurality of object fusion signals, or estimation error values of the object fusion signals.

16. The object recognition processing apparatus according to claim 1, wherein when recognizing an object existing around a vehicle, an average value of a plurality of object fusion signals or estimation error values of the object fusion signals are determined on the basis of an object identification information signal added to each of the object fusion signals, and the recognition is performed on the basis of the determined value.

17. The object recognition processing apparatus according to claim 15, wherein when recognizing the object existing around the vehicle, the recognition is performed by using the object fusion signals for latest n processing periods.

18. The object recognition processing apparatus according to claim 16, wherein when recognizing objects existing around the vehicle, the recognition is performed by using the object fusion signals for latest n processing periods.

19. An autonomous driving system comprising a vehicle control unit for controlling an operation of a vehicle on the basis of an output of the object recognition processing apparatus according to claim 1.

20. An object recognition method, comprising:
receiving a first detection information signal from a first object detection unit and a second detection information signal from a second object detection unit that is different from the first object detection unit;
determining whether or not both the first detection information signal and the second detection information signal have object identification information;
determining whether first object identification information in the first detection information signal is different from second object identification information in the second detection information signal if both the first detection information signal and the second detection information signal have object identification information;
based on the first object identification information being determined to not be different from the second object identification information, setting an object motion difference threshold to a first value;
based on one of the first detection information signal and the second detection information signal having object identification information, or none of the first detection information signal and the second detection information signal having object identification information, setting the object motion difference threshold to a second value that is less than the first value;
determining whether a difference between first position or speed information of the first detection information signal and second position or speed information of the second detection information signal is equal to or less than the object motion difference threshold; and
based on the difference between the first position or speed information and the second position or speed information being determined to be equal to or less than the object motion difference threshold:
fuse the first and second detection information signals into one fused signal for a same object; and recognize the same object existing around the vehicle on the basis of the fused signal for the same object.

21. An object recognition method comprising:

detecting objects existing around a vehicle by using a plurality of object detectors, receiving detection information of the objects from the respective object detectors, fusing detection information signals of the objects detected by the plurality of object detectors to output object fusion signals;

selecting for a combination of object fusion signals, candidates of the object fusion signals to be combined;

determining whether or not a combination of the selected object fusion signals is a combination of object fusion signals of the same object; and recognizing the objects existing around the vehicle on the basis of a result of the determination, wherein when determining whether or not the combination of the selected object fusion signals is a combination of object fusion signals of the same object, if, in a combination of the object fusion signals selected in latest n processing periods (n: natural number), the number of times of object detections used for fusion of objects for the latest n processing periods is equal to or more than a determination threshold for combination of fusion signals of the same object, this combination is determined to be a combination of fusion results of the same object.

* * * * *